Dec. 4, 1962
K. D. BOWERS ETAL
3,067,379
HIGH FREQUENCY GENERATOR
Filed April 29, 1958
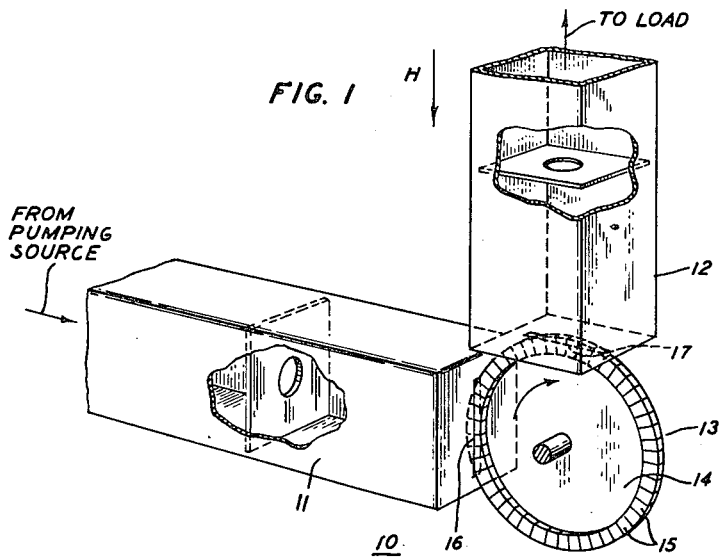
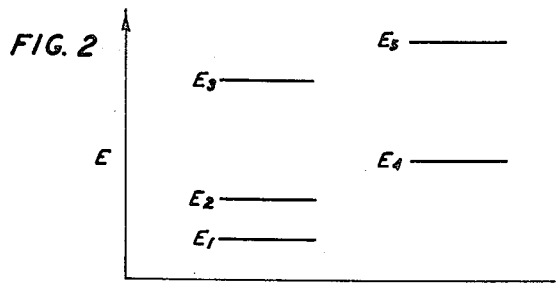
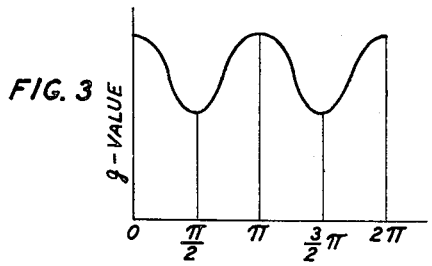
INVENTORS K. D. BOWERS
R. KOMPFNER
W. B. MIMS
BY
*Arthur J. Torsiglieri*
ATTORNEY

United States Patent Office 3,067,379
Patented Dec. 4, 1962

3,067,379
HIGH FREQUENCY GENERATOR
Klaus D. Bowers, Murray Hill, and Rudolf Kompfner, Holmdel, N.J., and William B. Mims, New York, N.Y., assignors to Bell Telephone Laboratories, Incorporated, New York, N.Y., a corporation of New York
Filed Apr. 29, 1958, Ser. No. 731,702
2 Claims. (Cl. 321—69)

This invention relates to generators of electrical oscillations of very short wavelengths, and more particularly to generators which utilize stimulated emission of radiation from paramagnetic solids. Devices which employ stimulated emission of radiation for amplification are now generally described as masers.

It is characteristic of a maser that there is included therein an active medium in which there is established by one of various suitable techniques an inverted population state with respect to a pair of energy levels thereof, such inverted population state generally being described as a negative temperature. A medium at a negative temperature is capable of amplifying energy applied thereto of a frequency corresponding to the separation of the two energy levels between which the inverted population state exists. Generally, for the creation of a negative temperature in a medium, it is necessary to supply first thereto energy of a suitable frequency. Ordinarily it is difficult, particularly in a solid medium, to realize a negative temperature with respect to a frequency higher than that used for creating the negative temperature. As a consequence, masers have not seemed especially attractive for use as generators of oscillations of short wavelengths.

An object of the present invention is to realize in a solid a negative temperature at a frequency considerably higher than that used to create the negative temperature.

To this end, one element of the invention is an active medium which comprises a paramagnetic crystal having anisotropic field splitting $g$-values, so that by rotation of the crystalline axis with respect to an applied magnetic field after a negative temperature has been established there may be increased the separation of the pair of energy levels between which the negative temperature exists.

A related feature of the invention is an arrangement including a pair of cavities and provision for maintaining a paramagnetic crystal in the first or charging cavity such that the orientation of its crystalline axis with respect to an applied magnetic field corresponds to a small $g$-value while creating a negative temperature at a relatively low frequency therein, and thereafter moving the paramagnetic crystal into the second or radiation cavity such that the orientation of its crystalline axis to the applied magnetic field results in a large $g$-value whereby the frequency at which the negative temperature exists is increased.

In a preferred embodiment, continuous wave operation is made possible by providing a circular rotating member which includes an annular peripheral region comprising a succession of segments, each an appropriate paramagnetic crystal having its crystal axis extending radially.

An important additional feature of the invention is a novel arrangement for establishing a negative temperature in a paramagnetic crystal. In particular, there is utilized as the negative temperature medium a composite crystal including both a charging paramagnetic salt having three discrete energy levels and a radiating paramagnetic salt having a pair of energy levels whose separation is the same as that of the more widely separated of the adjacent pairs of the three discrete energy levels of the charging paramagnetic salt under the operating conditions present. Additionally, the radiating paramagnetic salt is chosen to have anisotropic $g$-values to achieve the effects discussed above. A negative temperature may be created between the pair of energy levels of the radiating material simply by creating a negative temperature between the pair of energy levels of the charging material having the same separation. This latter condition is readily established by supplying to the composite crystal power of frequency corresponding to the separation between the pair of nonadjacent levels of the three-level charging material.

In an illustrative embodiment, a composite crystal including a three-level paramagnetic charging material and a two-level paramagnetic radiating material having anisotropic $g$-values is passed first through a charging cavity for establishing a negative temperature with respect to the two levels of the radiating material and then through a radiation cavity where radiation is permitted to occur. The orientation of the crystalline axis relative to an applied magnetic field in which the two cavities are immersed is arranged to be different in the two cavities whereby the charging frequency is less than the radiation frequency. In a preferred embodiment, a member is provided comprising a circular array of composite crystals of the kind described, each having its axis extending radially, and this member is rotated so that successive crystals of the array pass in turn through the charging and radiation cavities.

The invention will be better understood from the following more detailed discussion, taken in conjunction with the accompanying drawing, in which:

FIG. 1 shows as an illustrative embodiment of the invention a high frequency generator utilizing stimulated emission of radiation from a composite crystal of the kind described which has been put into a negative temperature state;

FIG. 2 shows the energy level diagrams of the two paramagnetic salts included in the composite crystal used in the generator shown in FIG. 1; and FIG. 3 shows how the value of field splitting parameter $g$ varies with the orientation of the crystalline axis relative to an applied magnetic field for a typical paramagnetic salt having anisotropic $g$-values.

With reference now to the drawing, the high frequency generator 10 shown in FIG. 1 comprises two cavities 11 and 12. The charging cavity 11 is designed to be resonant at the pumping frequency, the frequency of the energy to be supplied as the primary source. This frequency is related to the characteristics of the paramagnetic salt to be used as the charging material in the composite crystalline material to serve as the negative temperature medium. The radiation cavity 12 is designed to be resonant at the output frequency, the frequency of the oscillatory energy to be supplied to the load. This output frequency is related to the characteristics of the paramagnetic salt to be used as the radiating material in the composite crystal to serve as the negative temperature medium. An assembly 13 is provided which typically includes a low loss dielectric nonmagnetic support 14 on which is mounted a circular array, typically of about fifty, of paramagnetic crystals 15, each of which is positioned so that its crystalline axis extends radially with respect to the circular array. The relative positions of the cavities 11, 12 and the assembly 13 are such that at any particular moment a portion of the assembly including a portion of at least one crystal extends into cavity 11 by way of a suitable aperture 16 in one of its end walls and a different portion extends into cavity 12 by way of a suitable aperture 17 in one of its end walls. As shown the two portions in apertures 16 and 17 have a mean separation of about 90 degrees along the circular array. The assembly 13 is rotated about its circular axis in the direction indicated. Various arrangements (not shown)

may be used for providing the rotation. Typically, the assembly may be supported by an axial rod which is mechanically coupled to the rotating shaft of an electric motor. The rate of rotation of the assembly 13 is advantageously as high as is practicable, typically at least several thousand revolutions per minute, in order to achieve high efficiency for the maser action. Advantageously, the mechanical coupling may be such as to make the rotation rate of the assembly higher than that of the driving motor. The two cavities and the assembly are immersed in a steady magnetic field shown schematically by the vector H. Conventional magnetic flux producing apparatus (not shown) may be employed to establish this field.

Each of the paramagnetic crystals advantageously includes, dispersed in its lattice, both molecules of a paramagnetic salt whose energy system includes at least three energy levels to serve as the charging material and of a paramagnetic salt whose energy system includes a pair of energy levels to serve as the radiating material. In addition, the major portion of the lattice of each crystal advantageously is made up of molecules of a diamagnetic diluent. Such dilution makes it possible to realize discrete energy levels.

In FIG. 2, there is depicted the energy level characteristics desired for the paramagnetic salts included in each composite crystal. The separations of the energy levels of the two paramagnetic salts does vary with the strength of the applied magnetic field and the orientation of the crystalline axis with respect to such field so that the characteristics depicted are typical of those desired at the point where each crystal is most fully positioned within the charging cavity. In particular, as depicted the charging material is characterized by three discrete levels $E_1$, $E_2$ and $E_3$ of increasingly higher levels, respectively, in which the separation of adjacent levels $E_1$, $E_2$ is smaller than the separation of adjacent levels $E_2$, $E_3$. Additionally, on the right in this figure there is shown the energy level diagram of a paramagnetic salt suitable for use as the radiating material. As shown in this figure, the separation of the two levels $E_4$ and $E_5$ characteristic of the two-level material is such as to match the separation between the pair of more widely separated adjacent levels $E_2$, $E_3$ of the three-level material. By appropriate choice of materials, it is made possible to make the separation of levels $E_2$ and $E_3$, the wide separation and to establish a negative temperature with respect to these levels.

Typically, the composite crystal includes about as much of the charging material as of the radiating material.

For providing a negative temperature in the composite crystal, pumping power of a frequency corresponding to the separation of energy levels $E_1$ and $E_3$ of the charging material is continuously supplied from a suitable primary source, such as a reflex klystron, to the resonant cavity. The amount of power supplied is made adequate to saturate these two levels, whereby the populations of these two levels become substantially equal. This results in the establishment of a negative temperature between energy level $E_2$ and one of the levels $E_1$ and $E_3$. By appropriate choice of the charging material and the operating conditions, it is possible to achieve a negative temperature specifically between $E_2$ and the more widely separated level $E_3$. In particular, if there be chosen for the charging material a paramagnetic salt that has an additional pair of levels whose separation corresponds to the separation of levels $E_1$ and $E_2$, there results a decrease in the spin lattice relaxation time between levels $E_1$ and $E_2$. By decreasing sufficiently this spin lattice relaxation time, it can be assured that the negative temperature will be established between levels $E_2$ and $E_3$.

Once the spin systems involving levels $E_2$ and $E_3$ of the charging material and levels $E_4$ and $E_5$ of the radiating material are in resonance, the temperatures of the two systems will come into equilibrium. If the negative temperature of the charging material is adequate, the equilibrium temperature will also be negative.

Additionally, as previously mentioned, in accordance with an important feature of the invention, the two-level radiating material is chosen to have anisotropic magnetic field-splitting $g$-values whereby the separation between the two levels varies with the angle between the crystalline axis of the material and the direction of the applied magnetic field. In FIG. 3, there is shown how the $g$-value varies with this angle $\theta$ for a typical material having anisotropic $g$-values.

This variation in $g$-values is utilized to advantage in the practice of the invention by charging the radiating material to a negative temperature at a time when it has a low $g$-value and thereafter discharging it at a time when it has a high $g$-value. In particular, in the case depicted the direction of the applied magnetic field H is so arranged that the crystalline axis of the radiating material is substantially perpendicular to the applied magnetic field H in the charging cavity 11, and substantially parallel to the field H in the radiation cavity 12. Depending on the choice of materials, various other orientations of the applied magnetic field may be preferred. The strength and orientation of the applied magnetic field are also arranged so that there is satisfied in the charging cavity 11 the relationships between energy levels of the charging and radiating materials described in connection with FIG. 2.

The radiation cavity 12 is designed to be resonant at the frequency corresponding to the separation of the two levels of the radiating material when such material is positioned within this cavity with its crystalline axis substantially parallel to the applied magnetic field, resulting in a high $g$-value. By appropriate choice of materials and operating conditions, this output frequency can be considerably higher than the pumping frequency. The emission of radiation at the resonant frequency of the cavity 12 from the crystal is made sufficient to give rise to oscillations at the resonant frequency in the cavity 12. To this end, it is important that the spin lattice relaxation time between the two levels at a negative temperature of the radiating material be larger than the time it takes for each crystal to pass from the charging cavity 11 to the radiation cavity 12. This can be insured most readily by providing a fast enough rotation rate. The oscillatory energy developed in the radiation cavity 12 can be abstracted for utilization in a conventional manner by a suitable coupling connection to the cavity.

There is a wide variety in the possible choices of materials and operating conditions for the practice of the invention. A suitable choice of materials for the case depicted includes a crystal which comprises approximately 96.0 percent yttrium ethyl sulphate, which serves as the diamagnetic diluent, approximately two percent gadolinium ethyl sulphate, which serves as the three-level charging material, and approximately two percent terbium ethyl sulphate, which serves as the two-level radiating material. A typical set of operating conditions for use with this crystal includes a pumping frequency of about 29.2 kilomegacycles, a radiating frequency of about 126 kilomegacycles, and a magnetic field of about 4.67 kilogauss applied to be substantially perpendicular to the crystalline axis in the charging cavity and substantially parallel to the crystalline axis in the radiation cavity. Correspondingly, the charging cavity is designed to be resonant at 29.2 kilomegacycles and the radiation cavity is designed to be resonant at 126 kilomegacycles. In order to make it possible to use cavities of convenient size, operation at higher order resonance modes in the manner known is advantageous.

Various modifications in the oscillator described are feasible.

The arrangement described may be modified to increase the ratio of the radiating frequency to the charging frequency by immersing the radiation cavity in a stronger magnetic field than that in which the charging cavity is immersed. In such an arrangement, it will be advantageous additionally to insert magnetic shielding between the two cavities. This increase in strength of the magnetic field in which the radiation cavity is immersed will result in an increase in the Zeeman splitting in the radiation cavity and, accordingly, a higher radiation frequency.

Of course, various additional forms of mechanical arrangements are feasible for providing the desired translation of the radiating material between charging and radiating cavities.

Moreover, while there has been discussed specifically a composite crystal having a charging paramagnetic salt and a radiating paramagnetic salt chosen such that the resonance between two levels of the latter and the two of the former between which a negative temperature is established occurs at the time such negative temperature is first established, it is possible to provide that such resonance occurs in the interval while the composite crystal is being translated from the charging to the radiating cavity.

What is claimed is:

1. In combination, a first cavity resonant at a pumping frequency, means for applying energy of pumping frequency to said cavity, a second cavity resonant at a radiating frequency higher than said pumping frequency, means supplying a magnetic field within which are immersed said first and second cavities, movable means including at least one paramagnetic crystal for passing said paramagnetic crystal in turn through said first and second cavities, said paramagnetic crystal including a charging paramagnetic salt and a radiating paramagnetic salt characterized in that the charging salt has at least three discrete energy levels such that when the crystal is in the first cavity the separation between a pair of nonadjacent energy levels corresponds to the pumping frequency whereby a negative temperature is established between a pair of adjacent energy levels, and the radiating salt has at least a pair of discrete energy levels and anisotropic $g$-values such that the separation of the pair of energy levels matches the separation of the two levels of the charging solid between which the negative temperature is established at some point in the passage of the paramagnetic crystal from the first to the second cavities and the separation of the two levels when the radiating salt is in the second cavity corresponds to the radiating frequency.

2. The combination of claim 1 in which the orientation of the paramagnetic crystal axis with respect to the magnetic field is different in the two cavity resonators.

References Cited in the file of this patent

UNITED STATES PATENTS

| 2,671,884 | Zaleski | Mar. 9, 1954 |
| 2,981,894 | Scovil | Apr. 25, 1961 |
| 2,993,176 | Bolef et al. | July 18, 1961 |

OTHER REFERENCES

Article by Bolef and Chester in IRE Transactions and Microwave Theory and Techniques, January 1958.